United States Patent [19]

Luise

[11] 4,247,514

[45] Jan. 27, 1981

[54] PROCESS FOR STRENGTHENING A SHAPED ARTICLE OF A POLYESTER

[75] Inventor: Robert R. Luise, Wilmington, Del.

[73] Assignee: E. I. du Pont De Nemours and Company, Wilmington, Del.

[21] Appl. No.: 873,658

[22] Filed: Jan. 30, 1978

Related U.S. Application Data

[60] Division of Ser. No. 683,395, May 5, 1976, abandoned, which is a continuation-in-part of Ser. No. 625,133, Oct. 23, 1975, abandoned.

[30] Foreign Application Priority Data

May 5, 1975 [SE] Sweden ................................ 7551896

[51] Int. Cl.³ .............................................. B29C 25/00
[52] U.S. Cl. ...................................... 264/345; 264/85; 264/235; 264/342 R; 264/342 RE; 264/346; 528/191; 528/193
[58] Field of Search .......... 264/345, 85, 235, 342 RE, 264/342 R, 346; 260/47 C, 75 R, 75 T; 528/191, 193

[56] References Cited

U.S. PATENT DOCUMENTS

| | | | |
|---|---|---|---|
| 3,030,173 | 4/1962 | Kurzke et al. | 264/342 RE |
| 3,036,990 | 5/1962 | Kantor et al. | 260/47 C |
| 3,374,202 | 3/1968 | Schwarz | 260/75 R |
| 3,400,194 | 9/1968 | Boone et al. | 264/210 F |
| 3,671,542 | 6/1972 | Kwolek | 260/30.8 K |
| 3,673,143 | 6/1972 | Bair et al. | 260/78 S |
| 3,778,410 | 12/1973 | Kuhfuss et al. | 260/47 C |
| 3,804,805 | 4/1974 | Kuhfuss et al. | 260/47 C |
| 3,819,587 | 6/1974 | Kwolek | 260/78 S |
| 3,827,998 | 8/1974 | Morgan | 260/30.8 R |
| 3,888,965 | 6/1975 | Kwolek | 264/342 RE |
| 4,118,372 | 10/1978 | Schaefgen | 528/191 |

*Primary Examiner*—Lester L. Lee

[57] ABSTRACT

Heat treatment of shaped articles, larger than films or fibers, formed from anisotropic-melt-forming polymers provides an increase of at least 25% in energy to break in flexure. In at least one direction of measurement the heat treated articles are characterized by a flexural break strength of at least 10,000 psi, maximum strain to break in flexure of at least 2% and a flexural modulus of at least 500,000 psi. In many instances the heat treated articles can be further characterized by a notched Izod impact strength of at least 2 foot-pounds per inch.

Since the heat-treated shaped articles have high levels of strength, stiffness and toughness, they are useful as replacements for some metals, e.g., brass.

17 Claims, 1 Drawing Figure

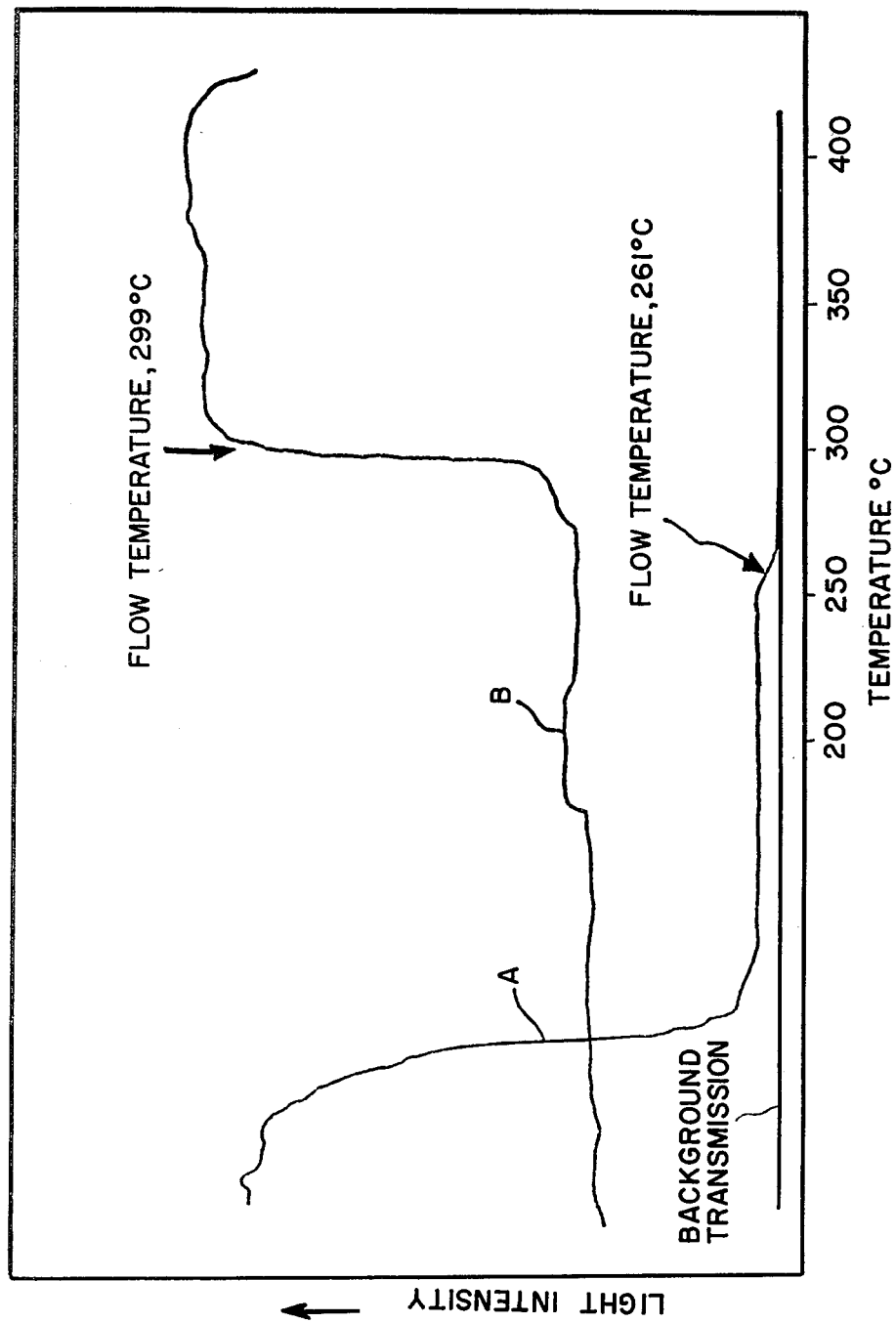

PROCESS FOR STRENGTHENING A SHAPED ARTICLE OF A POLYESTER

RELATED APPLICATION

The present application is a division of application Ser. No. 683,395 filed May 5, 1976 now abandoned, which is in turn a continuation-in-part of Ser. No. 625,133, filed Oct. 23, 1975 and now abandoned.

BACKGROUND OF THE INVENTION

The present invention relates to heat treatment of shaped articles, larger than films or fibers, formed from anisotropic-melt-forming polymers, especially polyesters and copolyesters.

Annealing of molded plastic articles to relieve stresses is well known in the art. This type of heat treatment does not generally improve mechanical properties, particularly toughness. Upon annealing prior art polyesters, for example, polyethylene terephthalate, elongation and toughness generally decrease even though temperatures are used which are quite low compared to the melting point of the polymer. Typical results are described in *Journal of Macromolecular Science, Physics B* 8 (1–2) pages 343–359 (1973) by R. M. Mininni, R. S. Moore, J. R. Flick, and S. E. B. Petrie. This publication discloses that annealing of a film at a temperature of 51° C. for 90 minutes reduces elongation by more than 70%. Although the time scale is longer, other work shows similar effects for more massive shapes.

In view of these well-known effects, other than for removal of stress heat treating is not generally employed for improving mechanical properties of a polymer.

SUMMARY OF THE INVENTION

This invention is directed to a process of heating shaped articles, larger than films or fibers formed from certain anisotropic-melt-forming polymers, especially polyesters and copolyesters and to articles formed therefrom. The heat treatment is for a sufficient period to provide an increase of at least 25% in energy to break as measured by the area under a stress/strain curve. If the shaped articles are sufficiently large to perform a notched Izod test, the increase of at least 25% in energy to break can additionally be measured by this test.

The heat-treated articles with either anisotropic or isotropic mechanical properties possess a flexural strength of at least 10,000 psi, a maximum strain to break in flexure of at least 2%, a flexural modulus of at least 500,000 psi. Also, if the article is sufficiently large, a notched Izod impact strength of at least 2 foot-pounds per inch is obtained.

DRAWING

The FIGURE is a schematic of background transmission and intensity traces determined on two polymers as described hereinafter.

DETAILED DESCRIPTION

Precursor Shaped Article

The shaped articles that are heat treated according to this invention are larger than films and fibers and are obtained from anisotropic-melt-forming linear polymers. By "shaped article" is meant a solid material of a dimensional size larger than a film or fiber. By "anisotropic-melt-forming" polymer is meant one which forms an anisotropic melt according to the thermooptical test (TOT) described below and is also capable of being melt spinnable.

Anisotropic-melt-forming Polymers

Useful anisotropic-melt-forming polymers should have a flow temperature preferably in excess of 200° C. and should be linear condensation polymers in which the radicals that are attached to the in-chain functional groups (which are formed in the condensation process, e.g., carbonyloxy groups) are selected from the group of (1) single and fused 6-membered carbocyclic ring systems for example, naphthylene, and the like, wherein the chain-extending bonds of the ring system, if attached to the same ring, are positioned 1,4- to each other, and if attached to different rings, are in positions parallel and oppositely directed, and (2) multiple 6-membered carbocyclic ring systems preferably containing two or three rings in which the chain-extending bonds of each ring are in the 1,4-positions and in which the individual rings are joined by a chemical bond or a divalent radical containing no more than 4 acyclic in-chain atoms such as C, O or S and the like. Also intended in the foregoing are radicals which are substituted with, for example, chlorine, bromine, fluorine or lower alkyl (1–4 carbon atoms).

The polymers that are useful in this invention should melt at temperatures low enough for melt extrusion without substantial degradation, i.e., below about 375° C. The polymers must also be capable of being shaped by extrusion or molding.

The radicals that are attached to the in-chain functional groups and which conform to the aforementioned group (1) and (2) radicals, may be replaced in part by non-conforming radicals providing the latter do not interfere with the anisotropic-melt-forming capability of the polymer or the ability of shaped articles formed from such polymers to obtain an increase in notched Izod impact strength, maximum strain to break and flexural strengths.

Anisotropic-melt-forming (co)polyesters that are preferred for use in this invention consist essentially of recurring structural units selected from the group

 (I)

 and (II)

 (III)

wherein units I and II, if present, are present in substantially equimolar amounts; $R_1$, $R_2$ and $R_3$ are radicals selected from the group of (1) single and fused six-membered aromatic carbocyclic ring systems wherein the chain extending bonds of the ring system, if attached to the same ring, are positioned 1,4- to each other, and if attached to different rings, are in positions parallel and oppositely directed, and (2) multiple six-membered aromatic carbocyclic ring systems in which the chain-extending bonds of each ring are in the 1,4-positions and in which the individual rings are joined by a chemical bond or a divalent radical containing no more than 4 acyclic in-chain atoms; $R_2$ may also be

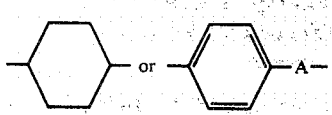

wherein A is a divalent radical containing one or two acyclic in-chain atoms; and $R_3$ may also be

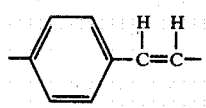

wherein the aliphatic portion is attached to the carbonyl group. Preferred group (1) radicals are phenylene and naphthylene while preferred group (2) radicals contain two phenylene rings. Of such (co)polyesters, most preferred are those consisting essentially of units I and II. The (co)polyesters, as mentioned above, may comprise units I and II in substantially equimolar amounts or may comprise a combination of units I, II, and III and, of course, more than one kind of each unit I, II and/or III can be present in the polymer.

Prime examples of polymers that are amenable to the process of the invention are the following: polymers which consist essentially of the recurring units

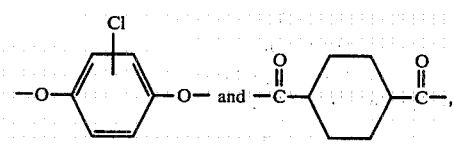

and polymers which consist essentially of the recurring units

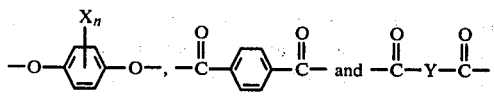

wherein X is selected from the group of chloro, and methyl; n is 1 or 2; Y is selected from the group of 4,4'-biphenylene and 2,6-naphthylene; and the ratio of

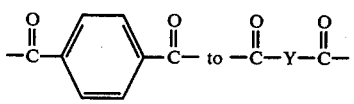

units is within the range of 4:1 to 1:4.

Also included among suitable anisotropic-melt-forming (co)polyesters are those wherein some of the I, II or III units may be replaced with aromatic polymer-forming units (i.e., units wherein the chain extending functional groups are attached to aromatic rings) not conforming to those described above and which do not interfere with the anisotropic melt-forming capability of the polymers. The nonconforming units in the polymer may constitute up to 30 mol %, based on the total I, II and III units and their replacement units. Where formula I and/or II units are replaced, the formula I units and their replacements are present in substantially equimolar amounts with the formula II units and their replacements.

The (co)polyesters are prepared preferably by melt polycondensation of derivatives of dihydric phenols and aromatic-aliphatic, aromatic and cycloaliphatic dicarboxylic acids or their derivatives. A convenient preparative method is the melt polycondensation of the diacetate of a dihydric phenol with a dicarboxylic acid. Alternatively, phenolic carboxylic acids or their derivatives may be used as coreactants in the preparation of polyesters and copolyesters.

A nonlimiting list of useful dihydric phenols preferably in the form of their diacetate derivatives includes hydroquinone, chlorohydroquinone, bromohydroquinone, methylhydroquinone, dimethylhydroquinone, dichlorohydroquinone, dibromohydroquinone, 4,4'-oxydiphenol, 4,4'-isopropylidenediphenol, 4,4'-thiodiphenol, 4,4'-biphenol, 3,5,3',5'-tetramethyl-4,4'-biphenol, 3,5,3',5'-tetrachloro-4,4'-biphenol, 2,6-dihydroxynaphthalene, 2,7-dihydroxynaphthalene, and 4,4'-methylenediphenol and the like.

A nonlimiting list of useful dicarboxylic acids includes terephthalic acid, 4,4'-bibenzoic acid, 4,4'-oxydibenzoic acid, 4,4'-thiodibenzoic acid, 4-carboxyphenoxyacetic acid, 4,4'-trans-stilbenedicarboxylic acid, 2,6-naphthalenedicarboxylic acid, ethylenedioxy-4,4'-dibenzoic acid, isophthalic acid, the halogen and methyl substituted derivatives of the foregoing dicarboxylic acids, 1,4-trans-cyclohexanedicarboxylic acid, 2,5-dimethyl-1,4-trans-cyclohexanedicarboxylic acid, and the like.

A nonlimiting list of phenolic carboxylic acids includes 4-hydroxybenzoic acid, 4-(4'-hydroxyphenoxy)-benzoic acid and 4-hydroxycinnamic acid and the like.

It is to be understood that while (co)polyesters useful in this invention can be prepared from all the ingredients cited above, not all combinations of ingredients yield polymeric species that are useful for preparing the precursor article for heat treatment. For example, the polyester from hydroquinone and terephthalic acid decomposes prior to melting. The polyester prepared from chlorohydroquinone and isophthalic acid does not form an anisotropic melt and an article thereof is not strengthened by the process of this invention.

Polymerization Conditions

The (co)polyesters are preferably prepared from appropriate monomers by melt polymerization techniques under anhydrous conditions in an inert atmosphere. For example, equimolar amounts of the reactant diacid and the diacetate of the dihydric phenol are combined in a reaction vessel equipped with a stirrer, nitrogen inlet tube, and combined distillation head-condenser (to facilitate by-product removal). The reaction vessel and other equipment are dried and purged with nitrogen prior to use. The vessel and stirred contents, maintained under nitrogen, are heated during which time the reactants polymerize and the by-product (acetic acid) is removed via the distillation head-condenser and is collected. When the polymerization appears nearly complete, as indicated by the amount of acetic acid collected remaining constant, the molten polymer mass is placed under reduced pressure (e.g., 1 mm. Hg or less) and is heated at a higher temperature to facilitate removal of the remaining acetic acid and to complete the polymerization. The melt may then be removed, cooled, and allowed to solidify prior to purification and/or subsequent processing. Optionally, the molten polymer may be transferred directly to a shaping apparatus.

Polymerization conditions may be varied according to, e.g., the reactants employed and the degree of polymerization desired. The melt should be sufficiently stable to allow shaping, e.g., extrusion or molding, without decomposition, especially without formation of gaseous products. Molecular weight attained should be sufficient for the product to exhibit film and/or fiber-forming properties although these articles are excluded by the present invention.

Anisotropic Melts

The anisotropy of these polymers in the molten state appears to facilitate attainment of high orientation, strength and/or initial modulus as the polymer is extruded or molded by conventional techniques. Whether the shaped polymer has anisotropic or isotropic mechanical properties is dependent on the type of shaping operation, e.g., on the degree of longitudinal flow of the molten polymer immediately prior to solidification.

It is well known that translucent optically anisotropic materials cause light to be transmitted in optical systems equipped with crossed polarizer [see, e.g., S. A. Jabarin and R. S. Stein, J. Phys. Chem. 77, 399 (1973)], whereas transmission of light is theoretically zero for isotropic materials. Thus, optical anisotropy can be determined by placing a sample of the polymer on a heating stage of a polarizing microscope and bringing the temperature up to and beyond the polymer flow temperature. If the polymer is optically anisotropic in the melt, a bright field will be observed at temperatures above the polymer flow temperature. This may be confirmed through use of the thermo-optical test (TOT) described below. The apparatus is similar to that described by I. Kirshenbaum, R. B. Isaacson, and W. C. Feist, Polymer Letters, 2, 897–901 (1964).

Production of Shaped Articles

The polymers are formed into useful shaped articles e.g., by extrusion or molding of the anisotropic melts. As previously defined, shaped articles exclude fibers and films since a purpose of the present invention is to obtain larger articles. Generally, the smallest dimension of the shaped article such as a sheet will be at least 1/32 inch or a cross-sectional area of at least 1/1000 square inch. For complex shaped articles, a thickness below 1/32 inch can be present although as a practical matter over one-half of the overall article thickness will at least equal 1/32 inch.

The molten polymer mass is obtained from melt polymerization of the (co)polymer-forming ingredients, through melting of heated (co)polymer powder or via the melting of a plug or block of (co)polymer. Conventional shaping techniques well known in the art are suitable to form an article from the anisotropic melt, e.g., extrusion through a die or molding by the injection or compression techniques.

Upon cooling of the anisotropic melt, the (co)polymer has a tendency to orient particularly if there is longitudinal flow of the melt during shaping. With orientation of the polymer, the shaped article will have anisotropic mechanical properties. Therefore, in one direction of measurement, one and generally all of the mechanical properties of flexural strength, maximum strain to break and flexural modulus (and also notched Izod impact strength if measured) are significantly higher in value than in other directions of measurement. Shaping of the anisotropic melt without substantial longitudinal flow permits the formation of articles without substantial orientation. In this case, an article formed from the polymer is isotropic, i.e., one and generally all of the discussed mechanical properties are substantially similar in the two directions of measurement. Particularly in shaping of a complex article, differences in orientation of the polymer can exist in different sections of the article.

Heat Treatment of Shaped Articles, Utility

The process of heat treating is for a period of time sufficient to obtain an increase in energy to break in flexure of at least 25% as measured by the area under a stress/strain curve. Energy to break is equal to one-half of the product of stress at break (expressed as pounds per square inch) times strain at break (expressed as inches per inch). Preferably the heat treatment step increases energy to break in flexure by at least 50% and most preferably by at least 100%.

If the heat-treated shaped articles are sufficiently large, an additional test can be employed to measure the increase in energy to break, i.e., a notched Izod impact test. The heat treatment is for a period of time sufficient to obtain an increase in energy to break of at least 25%. More preferably, the increase is at least 50% and most preferably at least 100%.

Heat treatment of the shaped articles can be carried out under a variety of time and temperature conditions. Preferably, part of the heat treatment should be close to, but below, the flow temperature of the polymer. The heat treatment generally proceeds more expeditiously as the temperature increases, provided flow of polymer does not take place.

Heat treatment temperatures from 140° C. to 350° C. or higher, preferably 240°–310° C. are useful. The heating period may vary from 10 minutes to ten or more hours. Use of lower temperatures, e.g., 140° to 220° C. requires longer time periods to obtain the increase in impact strength. "Heat treated" means use of a lowermost temperature of at least 140° C. (subsequent to formation of a shaped article from an anisotropic melt-forming polymer with cooling to less than the 140° C. temperature prior to being "heat treated".

Heated treatment of the shaped article may be conducted in an inert atmosphere (e.g., in nitrogen or in vacuo) in a heating device such as an oven, muffle or tube furnace. With polymers stable in an oxidizing atmosphere, e.g., poly(2-chloro-1,4-phenylene 4,4'-oxydibenzoate), air may be used instead of an inert atmosphere but the latter is preferred. Generally, the inert atmosphere within the oven or other heat-treating chamber is continuously purged during the treating period by a flow of inert gas (e.g., nitrogen) through the oven sufficiently fast to remove by-products from the vicinity of the shaped article. The process can be carried out under reduced pressure.

The temperatures employed for heat treating the shaped article must, at least initially, be below the flow temperatures thereof to avoid change in dimensions of the article. Preferably, the heating is carried out at temperatures close to but below such flow temperatures. As the polymer is heated, its flow temperature ordinarily increases somewhat, thus permitting still higher temperatures of heat treatment without melting. In essence, a new polymer flow temperature has been attained and heating is taking place below such temperature. It is generally desired to operate at the highest temperature permissible which does not cause flow of the polymer and is consistent with avoiding undue polymer degradation. Heat treatment temperatures have been employed which are above the temperatures at which the melt-forming polymers are shaped.

In a continuously adjusted process, the temperature of the atmosphere surrounding the shaped article is increased slowly at a regular rate of 3° C./min or less, depending on the thickness of the article and molecular weight of the polymer, up to a temperature as close to the flow temperature as possible. The article is then removed or allowed to cool before removal from the heating device. In a multistep process the article is subjected to a series of stepwise temperature increases (exposure times and temperatures may vary with article shape and polymer molecular weight). Heat treating just below the flow temperature (within 20° C.) for at least a part of the time is most preferred. In a single temperature process, the article is heated at only the highest possible temperature short of fusion for from 10 minutes to 10 hours. Modifications of the above can also be employed.

Heat Treated Shaped Articles, Utility

The heat treated shaped articles have a combination of high strength, stiffness and toughness. These articles possess flexural modulus of at least 500,000 psi and more preferably at least 1,000,000 psi, flexural strength of at least 10,000 psi, preferably 20,000 and most preferably 40,000 psi and a maximum strain to break in flexure of at least 2% and preferably at least 3%. If the heat treated articles are sufficiently large to perform a notched Izod impact strength, they possess a value of at least 2 foot-pounds per inch, preferably 3 foot-pounds per inch and most preferably 5 foot-pounds per inch. The above mechanical properties lie in at least one direction of measurement since these properties can likewise be obtained in a second direction of measurement perpendicular to the first direction.

The heat treatment of the shaped articles does not melt the articles and the orientation of the polymer changes little, if at all, due to heating. Either anisotropic or isotropic mechanical properties are obtained in the heat-treated article. It is possible to have anisotropic mechanical properties in one section of a heat-treated article and isotropic mechanical properties in another section. As defined herein "isotropic mechanical properties" of the heat-treated articles mean not more than a 10% variation in two directions of measurement perpendicular to one another of flexural modulus and flexural break strength (Experimental error is generally greater than 10% in measurement of maximum strain to break). For a heat-treated article, with isotropic mechanical properties, the notched Izod impact strength, if measurable, will likewise vary not more than 10% in two directions of measurement. Anisotropic mechanical properties denote greater than the 10% variation.

Heat-treated articles are useful as a replacement for some metals, preferably where use temperatures do not exceed 350° C., especially where a material is necessary with a combination of high levels of strength, stiffness and toughness. An example of a metal which may be replaced by the heat-treated shaped article is brass. Examples of specific heat-treated articles are reinforcement rods and bushings.

Measurements and Tests

Optical Anisotropy: Optical anisotropy may be measured by the TOT method described herein.

TOT and Flow Temperature Apparatus and Method

The thermo-optical test (TOT) requires a polarizing microscope which should have strain-free optics and sufficiently high extinction with crossed (90°) polarizers to be capable of giving a background transmission specified below. A Leitz Dialux-Pol microscope was used for the determinations reported herein. It was equipped with Polariod polarizers, binocular eye-pieces, and a heating stage. A photodetector (a photometer sensor) was attached at the top of the microscope barrel. The microscope had a 32×, long working distance objective, and a Red I (a first order Red) plate (used only when making visual observations with crossed polarizers; inserted at an angle of 45° to each polarizer). White light from an incandescent light source is directed through the polarizer, through the sample on the heating stage and through the analyzer to either the photodetector or the eyepieces. A slider permits transferring of the image from eyepieces to photodetector. The heating stage used is one capable of being heated to 500° C. A "Unitron" model MHS vacuum heating stage (Unitron Instrument Co., 66 Needham St., Newton Highlands, Massachusetts 02161) was used. The photodetector signal is amplified by a photometer amplifier and fed to the Y-axis of an X-Y recorder. The system response to light intensity should be linear and the precision of measurement within ±1 mm on the chart paper. The heating stage is provided with two attached thermocouples. One is connected to the X-axis of the X-Y recorder to record stage temperature, the other to a programmed temperature controller.

The microscope is focused visually (with crossed polarizers) on a polymer sample prepared and mounted as described below. The sample, but not the cover slip(s), is removed from the optical path. The Polariod analyzer of the microscope is removed from the optical path, the slider is shifted to transfer the image to the photodetector and the system is adjusted so that full-scale deflection (18 cm on the chart paper used) on the Y-axis of the X-Y recorder corresponds to 36% of the photometer signal. This is done by (1) adjusting the light source intensity so that the photometer meter reads a value preselected so that it corresponds to a Y-axis reading on the recorder of 5 cm; (2) increasing the amplification of the photometer by a factor of 10. This results in the full scale recorder deflection of 18 cm corresponding to (18/50)×100 or 36% of the photometer signal. The background transmission value is recorded with crossed (90°) polarizers and with the cover slip(s), but not the sample, in the optical path. The background transmission in the system used should be independent of temperature and should be less than about 0.5 cm on the chart paper. A sample film (see below) then is positioned so that essentially all the light intercepted by the photodetector will pass through the sample. With the sample between crossed (90°) polarizers and under nitrogen, the light intensity and temperature are recorded on the X-Y recorder as the temperature is raised at a programmed rate of about 14° C./min. from 25° to 450° C. With polyazomethines and other polymers that can rapidly polymerize on heating, the rate of heating is about 50° C./min. and the upper limit 465° C. The sample temperature is obtained from the recorded temperature by use of a suitable calibration curve.

The sample is a polymer film (made by pressing, or by cutting a section) preferably about 5 μm (micrometers) thick. Films that are too thick or too thin may fail to exhibit anisotropy by this test. However, if a good quality pressed film as prepared below does exhibit anisotropy by this TOT procedure, there is no need to repeat the test on a film that is about 5 μm thick. At times, microtomed films of about 2 μm in thickness were employed because uniform films of about 5 μm thickness were not available.

In most instances, and this is the preferred technique, polyester samples about 5 μm thick are prepared for TOT by microtoming (with a diamond knife) a solid well-coalesced chip of pure polymer mounted in epoxy resin and a polymer particle is used for flow temperature (see below) determination. The microtomed film is pressed flat between cover slips; one cover slip is removed and the film on the remaining cover slip is placed (glass down) on the heating stage for TOT measurement. For materials that shatter or do not produce a good quality film when microtomed and in the case of polyazomethines, duplicate films (about 5 μm thick) of polymer are prepared by heating a few particles of pure polymer between each of two sets of cover slips enclosed between a pair of microscope slides. By heating this assembly quickly above the flow temperature (independently determined approximately on a polymer particle) and applying pressure with a wooden tamp over each sample, thin liquid films of polymer are produced. These films solidify when cooled. One solid film between cover slips is used for the TOT procedure; the other is used directly (without cutting) for a flow temperature measurement. Since the polyazomethine samples may readily polymerize further during this procedure, it is important that heating time and temperature in the sample preparation for these polymers be kept to a minimum. Thickness of such pressed films may be estimated interferometrically. This is done conveniently indirectly by infiltrating an oil of known refractive index between the cover slips enclosing the sample and measuring the thickness of the oil layer at an interface with air in the region adjacent to the portion of sample to be observed in the TOT procedure. After the thickness is determined, the oil is readily removed by a short immersion in Freon ® TF solvent which is agitated ultrasonically.

To make certain that reliable results are obtained in the TOT procedure, it is important that films to be examined are of good quality. Film samples containing non-melting materials, or those with cracks, voids or bubbles are to be avoided. For example, expansion of voids or bubbles, especially in pressed films, may introduce anisotropy due to a shearing effect and thus cloud the results that are obtained. At the borderline composition range between polyesters showing static melt anisotropy (those useful in this invention) and those exhibiting only shear anisotropy, special care should be taken to eliminate readings due to shear anisotropy unintentionally introduced during pressed film formation. Microtomed films should be used or, if unavailable, pressed films should be maintained above the flow temperature long enough to dissipate the effects of shear anisotropy. Thereafter the TOT procedure may be carried out in the usual way.

The flow temperature of (co)polymers, cut films or fibers is observed visually between crossed (90°) polarizers on the heating stage assembly previously described for the TOT procedure. Cut samples for examination are prepared by cutting the article with a razor blade, and mounting the samples on a cover slip. Flow temperature is that temperature at which the sharp edges of the chip or polymer particle or the cut article edge become rounded, or at which the film edges of the duplicate pressed film change contour. This subtle change usually immediately precedes gross visible flow especially for polymers of low melt viscosity. Observations are made at a heating rate of 14° C./min. For azomethines and in a few other cases, where rapid further polymerization occurs, a faster rate, about 50° C./min. is used.

Alternatively, the minimum flow temperature may be determined by pressing a small sample of polymer, e.g., in powder form, between heated metal plates at moderate pressures (2000–5000 psi). The flow temperature is that temperature where a coherent film forms by the fusion of particles. This method may be most useful for polymers with very high melt viscosity (high molecular weight).

It should be understood that the flow temperature of these (co)polymers may vary depending on their history. For example, stepwise heating ordinarily raises the flow temperature. This permits heat treatment at temperatures above the initial flow temperature but below the newly attained flow temperature level. The reported flow temperature are those determined by these procedures.

Intensity Traces

The melt-forming (co)polymers useful for shaped articles in this invention are considered to form anisotropic melts according to the thermooptical test (TOT) if, as a sample is heated between crossed (90°) polarizers to temperatures above its flow temperature, the intensity of the light transmitted through the resulting anisotropic melt gives a trace whose height (1) is at least twice the height of the background transmission trace on the recorder chart and is at least 0.5 cm greater than the background transmission trace, or (2) increases to such values. Curve B of the Figure illustrates a type of intensity trace usually obtained for systems forming anisotropic melts.

The intensity of light transmitted through the analyzer when isotropic melts (the sample should be completely melted) are between crossed (90°) polarizers is essentially that of the background transmission (that obtained when the sample but not the cover slip is outside the field of view with 90° crossed polarizers). As these melts form, the intensity of the light transmission (1) is essentially that of the background transmission or (2) decreases to such values from a higher value. Curve A of the Figure illustrates an intensity trace of a polymer forming an isotropic melt.

Flexural Modulus, Flexural Strength and Strain

These tests were performed in accordance with ASTM D-790.

Notched Izod Impact Strength

This test was performed in accordance with ASTM D 256.

Tensile Modulus, Tensile Strength and Elongation

These tests were performed in accordance with ASTM D 638.

The following examples are provided to illustrate the present invention. Properties are measured in flexure unless otherwise stated.

EXAMPLE 1

This example illustrates the preparation of injection-molded articles (bars) of copoly(chloro-1,4-phenylene terephthalate/2,6-naphthalate) (7/3 mol basis) with high stiffness, strength and toughness in at least one direction.

Polymer is prepared as described in German OS No. 2,520,820 except that reaction times are altered to yield polymer of inherent viscosity of 3.2 as measured on a 0.5% solution at 30° C. in a mixture of trifluoroacetic acid/methylene chloride/1,3-dichloro-1,1,3,3-tetrafluoroacetone hydrate/1,1,2,2-tetrachloroethylene/p-chlorophenol (7.5/17.5/12.5/12.5/50 by volume).

The preparation of the polymer in the copending application is described below:

In a 2-liter resin kettle equipped with a Hastelloy stirrer, nitrogen inlet port, and fractionating column with variable reflux distillation head and collection flask is placed 733.9 g (3.21 mols) of chloro-1,4-phenylene diacetate, 348.9 g (2.10 mols) of terephthalic acid, and 194.6 g (0.90 mol) of 2,6-naphthalenedicarboxylic acid. The mixture is purged with nitrogen at 25° C. and is heated to 300° C. under nitrogen flow in a Woods metal bath. Stirring is started after 16 minutes. Distillate is collected after 30 minutes. The mixture is heated at 300° C. for a total of 129 minutes, whereupon the system is evacuated to a pressure of 380 mm Hg and the temperature is raised to 330° C. over 14 minutes. The pressure is reduced further to about 10 mm Hg in 11 minutes while slowly reducing the nitrogen flow to zero. The pressure is 2.0 mm Hg after an additional 3 minutes, 1.3 mm Hg after 3 more minutes and remains thereat for a further 4 minutes, all at 330° C. with stirring. The vacuum is released with nitrogen, stirring is stopped, and the light tan molten polymer is poured into an ice water bath. A total of 787 g of solidified polymer and 384 g of distillate are collected. The polymer is extracted in hot acetone. It forms an anisotropic melt above its TOT flow temperature of 302° C.

The polymer is molded in a 1" diameter hydraulic ram machine into $\frac{1}{8}"\times 5"\times \frac{1}{8}"$ or 1/16" bars at a cylinder temperature of 285°–305° C. and a mold at room temperature using 200–300 psi injection pressure.

The above bars are placed in an insulated oven purged continuously with 100 standard cubic feet/hour (SCFH) of nitrogen. The oven is heated to 220° C. in 80 minutes, then to 260° C. and held 2 hours, then to 275° C. and held 3 hours and, finally, to 300° C. and held 16 hours whereupon the heaters are turned off and the samples allowed to cool to 25° C. over a period of several hours. Properties on these shaped articles are presented below:

EXAMPLE 1

| | | FLEXURAL PROPERTIES | | | |
|---|---|---|---|---|---|
| | Thickness (in) | Modulus ($10^6$psi) | Break Strength ($10^3$psi) | Max. Strain to Break (%) | Energy to Break (psi) | Impact Strength Notched Izod (ft.lb/in.) |
| as molded | $\frac{1}{8}$ | 1.72 | 30.0 | 2.9 | 435 | 2.1 |
| | 1/16 | 2.27 | 30.6 | 2.6 | 398 | — |
| heat treated | $\frac{1}{8}$ | 1.75 | 36.8 | 5.1 | 938 | 5.1 |
| | 1/16 | 2.47 | 36.1 | 3.4 | 613 | — |
| change | $\frac{1}{8}$ | 2% | 23% | 76% | 116% | 143% |
| | 1/16 | 9% | 18% | 31% | 54% | — |

EXAMPLE 2

This example illustrates the preparation of compression molded articles of copoly(chloro-1,4-phenylene terephthalate/2,6-naphthalate) (7/3 mol basis) with high stiffness, strength and toughness in at least one direction.

The polymer prepared as in Example 1 with inherent viscosity of 1.9 was molded into $\frac{1}{8}"\times\frac{1}{2}"\times 5"$ bars at 345° C. with a 7-minute preheat and 3 minutes at 8,000 psi followed by cooling at about 20° C./minute under pressure.

These bars were heat treated as in Example 1. Properties are listed below:

| | FLEXURAL PROPERTIES | | | | |
|---|---|---|---|---|---|
| | Modulus ($10^6$psi) | Break Strength ($10^3$psi) | Max. Strain to Break (%) | Energy to Break (psi) | Impact Strength Notched Izod (ft-lb/in) |
| as molded | 0.98 | 13.2 | 1.9 | 125 | 1.7 |
| heat treated | 1.50 | 24.7 | 2.4 | 296 | 3.1 |
| change | +53% | +87% | +26% | +136% | +83% |

EXAMPLE 3

This example illustrates preparation of compression molded articles of poly(chloro-1,4-phenylene terephthalate/2,6-naphthalate) (7/3 mol basis) with high stiffness, strength and toughness in at least 2 directions perpendicular to one another.

The polymer prepared as in Example 1 with inherent viscosity of 3.2 was molded as in Example 2 into $\frac{1}{8}"\times 3"\times 3"$ plaques. Bars $\frac{1}{8}"\times\frac{1}{2}"\times 3"$ were cut from these plaques in the 2 major directions either before or after heat treatment under 9 SCFH nitrogen flow to 200° C. and held for 1 hour, then to 220° C. and held 1 hour, then to 240° C. and held 15 hours, then to 260° C. and held 12 hours, and, finally, to 300° C. and held 15 hours whereupon the heaters were turned off and the articles cooled in several hours to 25° C. Properties are listed below:

| | FLEXURAL PROPERTIES | | | | |
|---|---|---|---|---|---|
| | Modulus ($10^6$psi) | Break Strength ($10^3$psi) | Max. Strain to Break (%) | Energy to Break (psi) | Impact Strength Notched Izod (ft-lb/in) |
| as molded (either direction) | 0.62 | 15.8 | 4.3 | 340 | 1.7 |
| Heat treated (either direction) | 0.79 | 20.5 | 5.6 | 574 | 3.1 |
| Change | +26% | +29% | +29% | +69% | +83% |

EXAMPLE 4

This example illustrates preparation of shaped articles by compression molded from copoly(chloro-1,4-phenylene terephthalate/2,6-naphthalate) (7/3 mol basis) with high strength, stiffness and toughness in all directions within a plane.

The polymer, prepared as in Example 1, with inherent viscosity of 3.2 was molded into 0.095"×4.2' diameter discs at 345° C. under 1-2 tons pressure for 20 minutes and cooled slowly (½ to 1 hour) under pressure. Bars (0.095"×½"×2") were cut from these discs in any direction.

These bars were heat treated under 18 SOFH nitrogen flow by heating to 210° and held 1 hour, to 237° C. and held 2 hours, to 286° C. and held 13.5 hours and, finally, to 307° C. and held for 16 hours whereupon the heaters were turned off and the articles cooled slowly to 25° C. Properties are listed below:

| | FLEXURAL PROPERTIES | | | | |
|---|---|---|---|---|---|
| | Modulus ($10^6$psi) | Break Strength ($10^3$psi) | Max. Strain to Break (%) | Energy to Break (psi) | Impact Strength Notched Izod (ft-lb/in) |
| as molded | 1.5 | 31.4 | 4.2 | 659 | 3.9 |
| heat treated | 1.18 | 32.1 | 5.9 | 947 | 5.3 |
| change | −23% | +2% | +40% | +44% | +38% |

EXAMPLE 5

This example illustrates preparation of articles by injection molding of copoly(chloro-1,4-phenylene terephthalate/2,6-naphthalate) (7/3 mol basis) with high stiffness, strength and toughness in two directions perpendicular to one another.

The polymer, prepared as in Example 1, with inherent viscosity of 3.2 was injection molded into ⅛"×1.5"×2" plaques in a 1" diameter hydraulic ram machine at a cylinder temperature of 290° C. and a room temperature mold at 200 psi injection pressure.

These plaques were cut into ⅛"×½"×1.5" or 2" bars either parallel to (‖) or perpendicular to (⊥) the flow direction of the melt during the injection molding.

These bars were heat treated under 18 SCFH nitrogen flow to 226° C. and held for 2 hours, to 258° C. and held 12 hours, to 272° C. and held 12 hours and, finally, to 302° C. and held 17 hours followed by slow cooling to 25° C. Properties are listed below:

| | FLEXURAL PROPERTIES | | | | |
|---|---|---|---|---|---|
| | Modulus ($10^6$psi) | Break Strength ($10^3$psi) | Max. Strain to Break (%) | Energy to Break (psi) | Impact Strength Notched Izod (ft.lb/in) |
| As molded (‖)* | 1.18 | 29.6 | 4.2 | 622 | 4.8 |
| As molded (⊥)** | 0.61 | 30.0 | 11.9 | 1785 | 1.8 |
| Heat treated (‖) | 1.11 | 42.6 | 7.4 | 1576 | 7.1 |
| Heat treated (⊥) | 0.54 | 31.7 | 14.5 | 2298 | 2.6 |
| Change(‖) | −6% | +44% | +87% | +154% | +60% |
| Change (⊥) | −12% | +6% | +22% | +29% | +43% |

*‖ represents parallel
**⊥ represents perpendicular

EXAMPLE 6

This example illustrates the preparation of articles from copoly(chloro-1,4-phenylene terephthalate/2,6-naphthalate) (7/3 mol basis) with high strength and stiffness measured either in flexure or tension.

Properties measured on ⅛" thick flexural and tensile test bars prepared from the polymer of Example 5 and under the same molding and heat treatment conditions are listed below:

| | FLEXURAL PROPERTIES | | | | |
|---|---|---|---|---|---|
| | Modulus ($10^6$psi) | Break Strength ($10^3$psi) | Max. Strain to Break (%) | Energy to Break (psi) | Impact Strength Notched Izod (ft-lb/in) |
| as molded | 1.92 | 33.0 | 3.1 | 481 | 6.4 |
| heat treated | 2.02 | 36.6 | 3.3 | 856 | 15.4 |
| change | +5% | +11% | +6% | +78% | +140% |

| | TENSILE PROPERTIES | | | |
|---|---|---|---|---|
| | Modulus ($10^6$psi) | Break Strength ($10^3$psi) | Elongation to Break (%) | Energy to Break (psi) |
| as molded | 1.88 | 24.0 | 1.55 | 186 |
| heat treated | 2.38 | 32.8 | 2.05 | 336 |
| change | +23% | +36% | +28% | +81% |

EXAMPLE 7

This example illustrates preparation of articles by extrusion of copoly(chloro-1,4-phenylene terephthalate/2,6-naphthalate) (7/3 mol basis) with high strength.

The polymer of Example 2 was extruded through a 0.0473" diameter×0.749" long cylindrical die at a melt temperature of 311° C. at a stress of 3.92×$10^4$ dynes/cm$^2$ and a strain rate of 3.56 sec$^{-1}$ and through a 0.0825" diameter×0.375" long cylindrical die at a melt temperature of 300° C. at a stress of 2.3×$10^4$ dynes/cm$^2$ and strain rates of 7–14 sec$^{-1}$.

The extrudates (0.04" and 0.08" in diameter) were heat treated under 18 SCFH nitrogen to 220° C. and held 1 hour, to 250° C. and held 7 hours, to 275° C. and held 12 hours and, finally, to 301° C. and held 5.5 hours followed by slow cooling to 25° C. Flexural properties are listed below:

| | Flexural Strength at Break ($10^3$psi) | | Maximum Strain to Break (%) | | Energy to Break (psi) | |
|---|---|---|---|---|---|---|
| Diameter | 0.04 | 0.08 | 0.04 | 0.08 | 0.04 | 0.08 |
| as molded | 28.7 | 12.4 | 5.0 | 2.0 | 718 | 124 |
| heat treated | 30.3 | 19.6 | 6.0 | 3.5 | 909 | 343 |
| change | +6% | +58% | +20% | +75% | +27% | 177% |

EXAMPLE 8

This example illustrates the preparation of high strength articles by extrusion of copoly(methyl-1,4-phenylene terephthalate/isophthalate) (45/55, 50/50 and 60/40 mol basis).

The polymers are prepared as in Example 1 using 0.129 moles of methyl-1,4-phenylene diacetate and mixtures of terephthalic (0.054 to 0.072 moles) and isophthalic (0.054 to 0.066 moles) acids. Final stage of the polymerization was at 1 mm pressure or less for 1 hour at 330° C.

These polymers were extruded through a 0.0473″ diameter×0.749″ cylindrical die at 300°–320° C. and a strain rate of 35.6 sec$^{-1}$ and at a stress of 2.2, 1.37, 5.39, 2.84 dynes/cm×10$^5$ respectively for the mol basis polymer articles of 45/55, 50/50, 55/45 and 60/40.

These extrudates were heat treated under 3 SCFH N$_2$ to 159° C. and held 2.5 hours, to 212° C. and held 12 hours, to 240° C. and held 12 hours and, finally, to 253° C. and held for 12 hours followed by cooling to 25° C. in 20 minutes. Properties are listed below:

| T/I Ratio | Flexural Break Strength (10$^3$psi) | | | | Maximum Strain to Break % | | | |
|---|---|---|---|---|---|---|---|---|
| | 45/55 | 50/50 | 55/45 | 60/40 | 45/55 | 50/50 | 55/45 | 60/40 |
| as molded | 14.0 | 23.2 | 17.0 | 17.5 | 3.6 | 2.9 | 3.6 | 4.1 |
| heat treated | 17.8 | 29.1 | 24.7 | 22.4 | 6.9 | 7.0 | 6.5 | 6.6 |
| change | +27% | +25% | +45% | +28% | +130% | +130% | +80% | +61% |

| | Energy to Break (psi) | | | |
|---|---|---|---|---|
| | 45/55 | 50/50 | 55/45 | 60/40 |
| as molded | 210 | 336 | 306 | 359 |
| heat treatment | 614 | 1019 | 803 | 739 |
| change | +192% | +203% | +162% | +106% |

EXAMPLE 9

This example illustrates the preparation of high strength articles from poly(methyl-1,4-phenylene terephthalaldiimine), i.e., a polyazomethine.

A solution of 2-methyl-1,4-phenylenediamine (77.9 g 0.64 mol) in 200 ml of ethanol is prepared at room temperature. A second solution of terephthalaldehyde (81.3 g, 0.61 mol) is prepared in 200 ml of refluxing ethanol. These solutions are simultaneously poured into a 2-liter beaker; polymer precipitation begins in 1–3 minutes. This reaction mixture is permitted to stand overnight at room temperature, under nitrogen. After the ethanol is evaporated, the polymeric residue is washed with 1 liter of water and dried in vacuo at 110° C. for 1.5 hours. The dried residue is polymerized further in a heated screw extruder to an inherent viscosity of 17 (0.5% solution in 98% sulfuric acid at 25° C.).[1]

[1] The polymer sample, 98% sulfuric acid, an equal volume of 3 mm Teflon cubes, were combined in a closed bottle and placed on a shaking machine for the minimum time to form a solution, usually 10 to 25 minutes. A Cannon-Fenske viscometer was filled by inversion technique and placed in a constant temperature bath consisting of a saturated water solution of potassium dichromate. Three consecutive flow times were measured immediately. The shaking operation was conducted in the dark and all transfer steps were done quickly in subdued light.

This polymer is molded into 1/32″×½″×4″ bars at 290° C. for 3 minutes at 8,000 psi followed by quenching with ice water at atmospheric pressure.

A bar was heat treated as in Example 8. Properties are listed below:

| | FLEXURAL PROPERTIES | | | |
|---|---|---|---|---|
| | Modulus (10$^6$psi) | Break Strength (10$^3$psi) | Max. Strain to Break (%) | Energy to Break (psi) |
| as molded | 1.19 | 13.8 | 2.4 | 166 |
| heat treated | 1.20 | 20.1 | 3.5 | 382 |
| change | — | +45% | +45% | +112% |

What is claimed is:

1. A process for strengthening a shaped article formed by longitudinal flow of a melt of an anisotropic-melt-forming linear condensation polymer wherein the article is larger than a fiber or a film and in which the polymer is a (co)polyester consisting essentially of recurring structural units selected from the group

  (I)

  (II)

  (III)

wherein units I and II, if present, are present in substantially equimolar amounts: R$_1$, R$_2$ and R$_3$ are radicals selected from the group of (1) single and fused six-membered aromatic carbocyclic ring systems wherein the chain-extending bonds of the ring system, if attached to the same ring, are positioned 1,4- to each other, and if attached to different rings, are in positions parallel and oppositely directed, and (2) multiple six-membered aromatic carbocyclic rings systems in which the chain-extending bonds of each ring are in the 1,4-positions and in which the individual rings are joined by a chemical bond or a divalent radical containing no more than 4 acyclic in-chain atoms; R$_2$ may also be

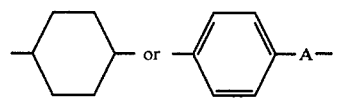

wherein A is a divalent radical containing one or two acyclic in-chain atoms; and R$_3$ may also be

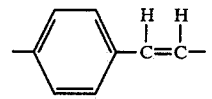

wherein the aliphatic portion is attached to the carbonyl group comprising heating said shaped article at a temperature from above 140° C. to below the flow temperature of the polymer for a period of time sufficient to increase energy to break in flexure by at least 25% in at least one direction of measurement.

2. The process of claim 1 wherein heating increases energy to break in flexure by at least 50%.

3. The process of claim 2 wherein heating increases energy to break in flexure by at least 100%.

4. The process of claim 1 wherein heating increases notched Izod impact strength by at least 25% in at least one direction of measurement.

5. The process of claim 2 wherein heating increases notched Izod impact strength by at least 50% in at least one direction of measurement.

6. The process of claim 3 wherein heating increases notched Izod impact strength by at least 100% in at least one direction of measurement.

7. The process of claim 1 wherein heating increases energy to break in flexure by at least 25% in two directions of measurement perpendicular to one another.

8. The process of claim 4 wherein heating increases both energy to break in flexure and notched Izod impact strength by at least 25% in two directions of measurement perpendicular to one another.

9. The process of claim 1, wherein the shaped article subjected to heating has been extruded.

10. The process of claim 1 wherein the shaped article subjected to heating has been injection molded.

11. The process of claim 1 wherein the shaped article subjected to heating has been compression molded.

12. The process of claim 1 wherein the polymer group (1) radicals are selected from phenylene and naphthylene and the polymer group (2) radicals are two-ring systems.

13. The process of claim 12 wherein the polymer consists essentially of units I and II.

14. The process of claim 1 wherein up to 30 mol % based on the total I, II and III units and their replacements are aromatic polymer-forming units not conforming to the formulas of I, II or III units.

15. The process of claim 1 wherein the heating is conducted in an inert atmosphere.

16. The process of claim 1 wherein the heating is for a period between 10 minutes and 10 hours.

17. The process of claim 15 wherein the heating comprises use of a temperature within 20° C. of flow temperature of the polymer.

* * * * *